(12) United States Patent
Itoh et al.

(10) Patent No.: US 8,298,705 B2
(45) Date of Patent: Oct. 30, 2012

(54) SEALED BATTERY

(75) Inventors: Yusuke Itoh, Tokushima (JP); Kenji Nansaka, Habikino (JP); Yasuhiro Yamauchi, Sumoto (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 364 days.

(21) Appl. No.: 12/779,487

(22) Filed: May 13, 2010

(65) Prior Publication Data

US 2010/0304214 A1   Dec. 2, 2010

(30) Foreign Application Priority Data

May 29, 2009   (JP) .................................. 2009-131361

(51) Int. Cl.
*H01M 2/08*   (2006.01)
(52) U.S. Cl. ........................ 429/185; 429/163
(58) Field of Classification Search .................... 429/185
See application file for complete search history.

(56) References Cited

FOREIGN PATENT DOCUMENTS

| JP | 59-44027 U | | 3/1984 |
|----|------------|---|--------|
| JP | 2003173767 A | * | 6/2003 |
| JP | 2003-229118 A | | 8/2003 |

* cited by examiner

*Primary Examiner* — Patrick Ryan
*Assistant Examiner* — Brent Thomas
(74) *Attorney, Agent, or Firm* — Westerman, Hattori, Daniels & Adrian, LLP (57) ABSTRACT

The sealed battery 10 includes an electrolyte pour hole 15 passing through the sealing plate 12; a rivet 16 having a shank part 16a, a flange part 16b covering a peripheral surface of the electrolyte pour hole 15, and a crimping part 16c in the electrolyte pour hole 15; and a gasket 18 interposed between the electrolyte pour hole 15 and the rivet 16 and adhering to the peripheral surface of the electrolyte pour hole 15 and to a back side of the flange part 16b of the rivet 6; on the peripheral surface of the electrolyte pour hole 15, an inner annular first convex part 17a and an outer annular second convex part 17b are formed; and on the back side of the flange part 16b of the rivet 16, an annular third convex part 16d is formed so as to be superimposed over the second convex part 17b.

7 Claims, 7 Drawing Sheets

SEALED BATTERY

TECHNICAL FIELD

The present invention relates to a sealed battery in which an electrolyte pour hole is sealed with a blind rivet with a gasket interposed therebetween. More particularly, the invention relates to a sealed battery in which an electrolyte that adheres to and remains on a peripheral surface of the electrolyte pour hole in an electrolyte pour process is suppressed from leaching out from between the peripheral surface of the electrolyte pour hole and the gasket.

BACKGROUND ART

As power supplies for driving portable electronic equipment such as cell phones, portable personal computers, and portable music players, sealed batteries such as alkaline secondary batteries represented by a nickel hydrogen battery and nonaqueous electrolyte secondary batteries represented by a lithium ion battery are widely used.

Figure 5:
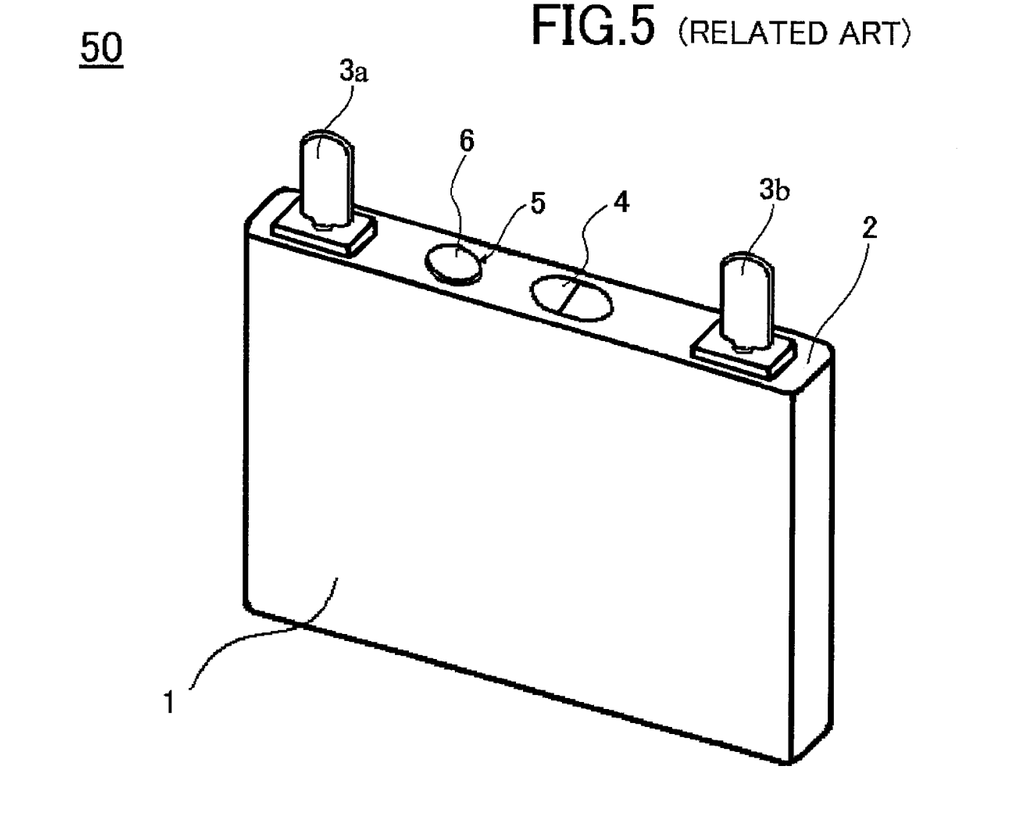
FIG. 5 is an overall schematic view showing a related-art sealed battery.

As shown in FIG. 5, a related-art sealed battery 50 commonly includes an outer can 1 having electric power generating elements such as an electrode assembly, a sealing plate 2 for sealing an upper mouth portion of the outer can 1, and two external electrode terminals 3a and 3b each protruding from each side of the sealing plate 2. Furthermore, the sealing plate 2 has a gas exhaust valve 4 for releasing internal pressure when the pressure in the outer can 1 is increased, along with an electrolyte pour hole 5 for pouring an electrolyte into the outer can 1.

FIG. 5 does not directly show the electrolyte pour hole 5 and only shows a flange part of a blind rivet 6 (hereinafter, simply referred to as "rivet") for sealing the electrolyte pour hole 5. In this manner, the electrolyte pour hole 5 is sealed with the rivet 6 so that the poured electrolyte would not leak from the outer can 1 (see, for example, JP-U-59-44027 and JP-A-2003-229118).

Figure 6A:
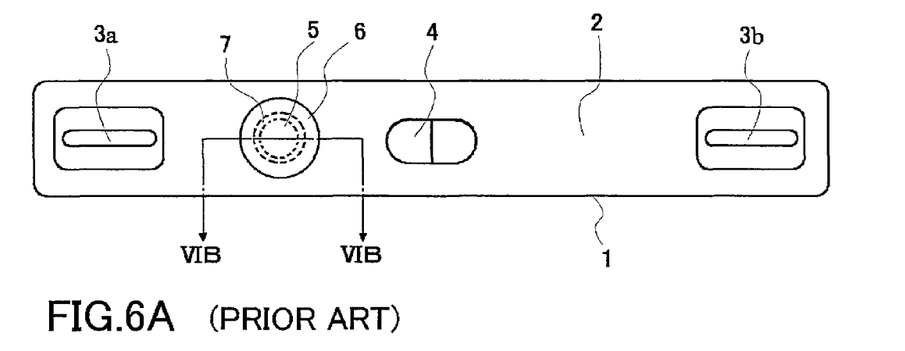
FIG. 6A is a plan view of a related-art sealed battery.
Figure 6B:
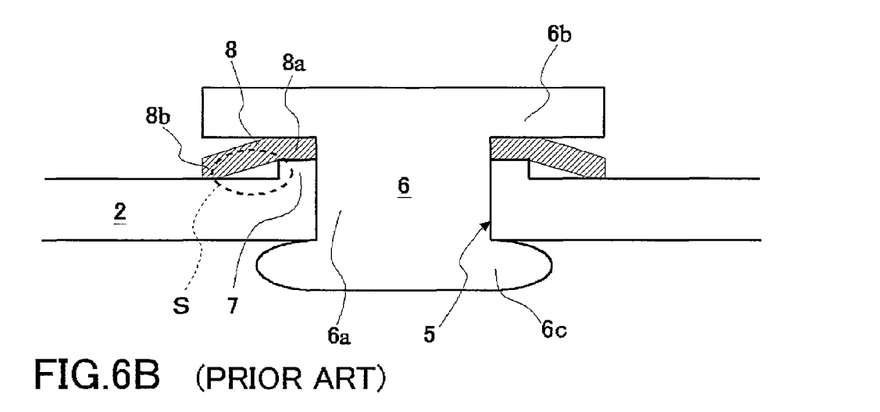
FIG. 6B is a cross-sectional view taken along the line VIB-VIB in FIG. 6A.
Figure 6C:
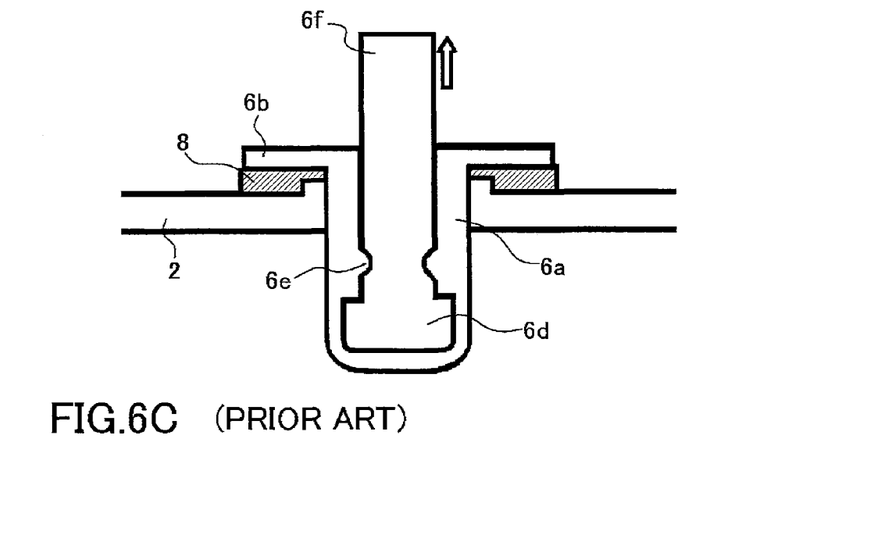
FIG. 6C is a cross-sectional view of a part corresponding to that in FIG. 6B showing the fixing structure of a rivet before crimping.

FIG. 6 show a sealing structure of the electrolyte pour hole with the rivet in such a related-art sealed battery. Here, FIG. 6A is a plan view of a related-art sealed battery 50, FIG. 6B is a cross-sectional view showing the vicinity of the electrolyte pour hole taken along the line VIB-VIB of FIG. 6A, and FIG. 6C is a cross-sectional view showing the part corresponding to that in FIG. 6B before the rivet that is attached to the pour hole is crimped. On a peripheral surface of the electrolyte pour hole 5, an annular convex part 7 is formed so as to surround the electrolyte pour hole 5 and to protrude in the axis direction of the can.

As shown in FIG. 6B, the rivet 6 is made of aluminum, has a shank part 6a inserted into the electrolyte pour hole 5, a flange part 6b covering the peripheral surface of the electrolyte pour hole 5, and a crimping part 6c, and is crimped to be fixed to the sealing plate 2 interposing an annular gasket 8 between the flange part 6b and the sealing plate 2. Thus, the annular gasket 8 is interposed between the electrolyte pour hole 5 and the rivet 6. An inner peripheral part 8a of the gasket 8 is partially strongly compressed by the annular convex part 7 and the flange part 6b of the rivet 6, and thus the electrolyte pour hole 5 maintains a high sealing performance.

As disclosed in, for example, JP-A-2003-229118, the crimping part 6c of the rivet 6 is formed in the following manner. That is, as shown in FIG. 6C, a rivet 6 is prepared. The rivet 6 includes in its inside a stainless steel center shank part 6f having an enlarged diameter part 6d at the leading end and having a reduced diameter part 6e on the upper part of the enlarged diameter part 6d and includes a flange part 6b. The rivet 6 further includes a cylinder-shaped shank part 6a that is inserted into an electrolyte pour hole 5. The shank part 6a has an envelope-shaped leading end. The annular gasket 8 is fitted to an outer periphery of the shank part 6a of the rivet 6, and then the shank part 6a of the rivet 6 is inserted into the electrolyte pour hole 5 so that the annular gasket 8 would be placed between the flange part 6b and the sealing plate 2.

Next, when the center shank part 6f is pulled upward with the flange part 6b of the rivet 6 pressed toward the sealing plate 2, the enlarged diameter part 6d at the leading end of the center shank part 6f is moved upward. Consequently, the diameter of the envelope-shaped leading end of the shank part 6a of the rivet 6 is enlarged to form a crimping part 6c. Thus, the rivet 6 is fixed in the electrolyte pour hole 5 and the center shank part 6f of the rivet 6 is cut off at the reduced diameter part 6e formed on the upper part of the enlarged diameter part 6d. As a result, the electrolyte pour hole 5 can be sealed fluid-tightly with the rivet 6. In FIG. 6B, actually, a void is formed in the rivet 6 and the enlarged diameter part 6d of the center shank part 6f stays in the rivet 6, but they are not shown in the drawing.

As described above, when the annular convex part 7 is formed on the peripheral surface of the electrolyte pour hole 5, the annular convex part 7 and the inner peripheral part 8a of the gasket 8 are partially strongly compressed by the annular convex part 7 and the flange part 6b of the rivet 6, so that the electrolyte pour hole 5 has a high sealing performance. However, as shown in FIG. 6B, the outer peripheral part 8b of the gasket that is not partially compressed by the annular convex part 7 bends downward, and consequently, only the side edge is sometimes brought into contact with the sealing plate 2. As a result, between the outer peripheral part 8b of the gasket and the surface of the sealing plate 2, an enclosed space S is formed.

Generally, in a pour process of an electrolyte, because an electrolyte adheres to and remains on the peripheral surface of the electrolyte pour hole 5, washing is performed after sealing the electrolyte pour hole 5 in order to remove the adhered electrolyte. However, when the electrolyte remains in the enclosed space S, the electrolyte cannot be removed by the washing. Moreover, the electrolyte remaining in the enclosed space S after washing is gradually leached out from the gasket 8 after the washing process, then the outside of the gasket 8 changes in color, and as a result, the sealed battery 10 has a poor appearance.

Figure 7A:
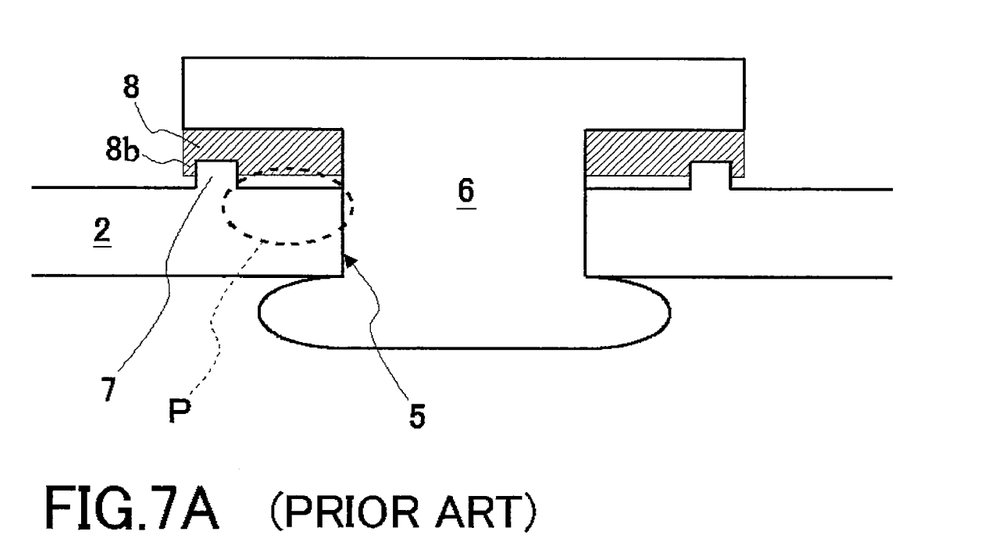
FIG. 7A is a cross-sectional view showing a first modified example of the sealing structure of a related-art electrolyte pour hole.

In order to solve the above problems, the inventors of the present invention have found that, for example as shown in FIG. 7A, when the annular convex part 7 is placed close to the outer peripheral part 8b of the gasket 8, the gasket 8 can be compressed near the outer peripheral part 8b of the gasket 8 by the annular convex part 7 and the rivet 6, and therefore the remaining electrolyte can be suppressed from leaching out from the enclosed space S. However, it is found that a battery having such a structure has other problems. That is, when the rivet 6 is crimped for fixing, a large upward force is applied to the peripheral part of the electrolyte pour hole 5. Thus, among the peripheral part of the electrolyte pour hole 5, a part P that is placed inside the annular convex part 7 is tend to be deformed when the rivet 6 is crimped for fixing, and consequently the adhesion between the gasket 8 and the annular convex part 7 becomes poor.

Figure 7B:
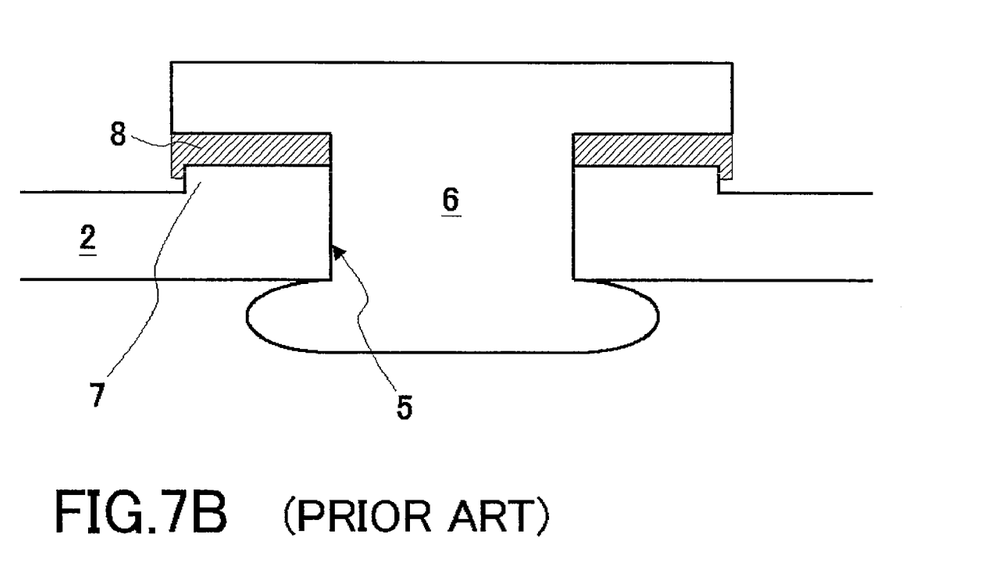
FIG. 7B is a cross-sectional view showing a second modified example.

Hence, as shown in FIG. 7B, an annular convex part 7 having a wider width than that in the related art is prepared. Such a structure can prevent the enclosed space S from forming as well as can maintain a high mechanical strength of the part P because the part P has a heavy wall thickness. Moreover, because of a short distance between the flange part 6b of the rivet 6 that is pressed downward when crimping and the sealing plate 2 that is pressed upward when crimping, deformation of the part P when crimping is inhibited. However, it is found that a battery having such a structure has other problems. That is, a larger contact area between the surface of the annular convex part 7 and the gasket 8 also causes poor adhesion therebetween.

SUMMARY

An advantage of some aspects of the invention is to provide a sealed battery that has high sealing performance of an electrolyte pour hole with a gasket that is partially strongly compressed by annular convex parts formed on a peripheral surface of the electrolyte pour hole as well as that can suppress leaching out, from between a peripheral surface of the electrolyte pour hole and the gasket, an electrolyte that adheres to and remains on the peripheral surface of the electrolyte pour hole in the electrolyte pour process.

According to an aspect of the invention, a sealed battery includes an outer can having a mouth portion, a sealing plate for sealing the mouth portion of the outer can, an electrolyte pour hole passing through the sealing plate, a rivet having a shank part inserted in the electrolyte pour hole and a flange part covering a peripheral surface of the electrolyte pour hole, and a gasket interposed between the peripheral surface of the electrolyte pour hole and a back side of the flange part of the rivet. On the peripheral surface of the electrolyte pour hole, an inner annular first convex part and an outer annular second convex part are formed, on the back side of the flange part of the rivet, an annular third convex part is formed, and a central vertical axis of the third convex part is placed between a central vertical axis of a groove between the first convex part and the second convex part and the central vertical axis of the second convex part.

In the sealed battery according to the aspect of the invention, the first convex part provides a mechanical strength to the peripheral part of the electrolyte pour hole, as well as provides a shorter distance between the flange part of the rivet that is pressed downward when crimping and the sealing plate that is pressed upward when crimping, and consequently, when the rivet is crimped for fixing to the sealing plate, deformation of the peripheral part of the electrolyte pour hole is inhibited. That is, when the rivet is crimped, the flange part is pressed from above, but, even when the peripheral part of the electrolyte pour hole would be deformed upward, because the distance between the first convex part and a bottom surface of the flange part of the rivet is short and the compressed gasket is in the narrow space that is narrowed in this manner, the peripheral part of the electrolyte pour hole is less susceptible to be deformed, and consequently, the deformation rarely occurs. Furthermore, the electrolyte that adheres to and remains in the groove formed between the first convex part and the second convex part is suppressed from leaching out from between the peripheral surface of the electrolyte pour hole and the gasket because the second convex part and the gasket can be sealed fluid-tightly.

In addition, because the central vertical axis of the third convex part is placed between the central vertical axis of the groove between the first convex part and the second convex part and the central vertical axis of the second convex part, a shear force can be applied to the gasket interposed between the third convex part and the first and second convex parts, and moreover, the gasket interposed between the third convex part and the second convex part can have a larger compressibility than that of the gasket interposed between the third convex part and the first convex part. Accordingly, the electrolyte that adheres to and remains in the groove formed between the first convex part and the second convex part is further suppressed from leaching out from between the second convex part and the gasket.

With the sealed battery according to the aspect of the invention, a sealed battery can be manufactured that has high sealing performance of the electrolyte pour hole with the gasket that is partially strongly compressed by the annular convex parts formed on the peripheral surface of the electrolyte pour hole as well as that can suppress leaching out, from between the peripheral surface of the electrolyte pour hole and the gasket, an electrolyte that adheres to and remains on the peripheral surface of the electrolyte pour hole in the electrolyte pour process.

In the sealed battery according to the aspect of the invention, the central vertical axis of the third convex part is preferably placed closer to the second convex part than the central vertical axis of the groove between the first convex part and the second convex part.

In the sealed battery according to the aspect of the invention, when the third convex part is placed so as to satisfy the above relation, the gasket between the third convex part and the second convex part can be further strongly compressed, and thus, the battery has a more pronounced action and effect of the second convex part by which the electrolyte that adheres to and remains in the groove formed between the first convex part and the second convex part can be suppressed from leaching out.

In the sealed battery according to the aspect of the invention, the third convex part is preferably formed not to be superimposed over the first convex part but to be superimposed over the second convex part in a plan view.

In this manner, when the third convex part is not superimposed over the first convex part but over the second convex part in a plan view, a shear force can be applied to the gasket interposed between the third convex part and the first and second convex parts, as well as the gasket interposed between the third convex part and the second convex part can have a larger compressibility than that of the gasket interposed between the third convex part and the first convex part. Thus, with the sealed battery according to the aspect of the invention, the electrolyte that adheres to and remains in the groove formed between the first convex part and the second convex part is further suppressed from leaching out from between the second convex part and the gasket.

In the sealed battery according to the aspect of the invention, the first convex part preferably has a wider width than the width of the second convex part.

The first convex part is formed in order to provide mechanical strength to the peripheral part of the electrolyte pour hole, as well as to provide a shorter distance between the flange part of the rivet that is pressed downward when crimping and the sealing plate that is pressed upward when crimping. When the first convex part has a wider width, the peripheral part of the electrolyte pour hole can be further inhibited to be deformed when the rivet is crimped for fixing to the sealing plate. Moreover, when the first convex part has a wider width than that of the second convex part, the part of the gasket interposed between the third convex part and the second convex part can readily have a large compressibility than that of the part of the gasket interposed between the third convex part and the first convex part. Thus, according to the sealed battery of the invention, the electrolyte that adheres to and remains in the groove formed between the first convex part and the second convex part can be further suppressed from leaching out from between the second convex part and the gasket.

In the sealed battery according to the aspect of the invention, when the width of the third convex part is W1 and the width of the second convex part is W2, the distance between the central vertical axis of the third convex part and the central vertical axis of the second convex part is preferably smaller than (W1+W2)/2.

In the sealed battery according to the aspect of the invention, when the third convex part is formed so as to satisfy the above relation, in particular, the above effects are remarkably exerted.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
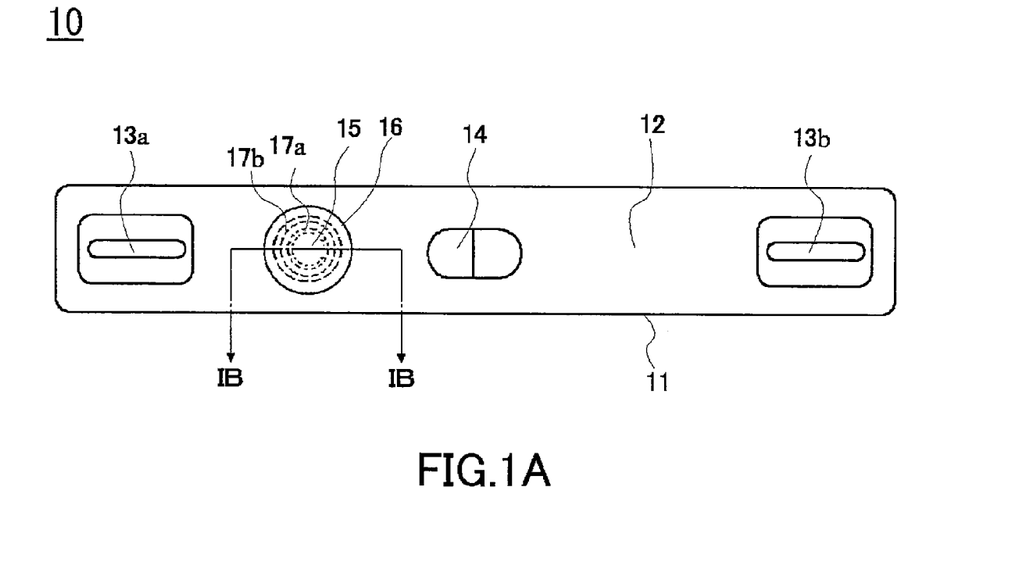
FIG. 1A is a plan view showing a sealing structure of an electrolyte pour hole in a sealed battery of the embodiment.

Hereinafter, exemplary embodiments of the invention will be described in detail with drawings. The overall appearance of the sealed battery of the embodiment is not described because it has a similar appearance to that of the related-art sealed battery previously shown in FIG. 5. As shown in FIG. 1A, the sealed battery 10 of the embodiment includes an outer can 11 and a sealing plate 12 for sealing an upper mouth portion of the outer can 11. The sealing plate 12 has two external electrode terminals 13a and 13b, a gas exhaust valve 14, and an electrolyte pour hole 15. To the electrolyte pour hole, a rivet 16 and a gasket 18 (see FIG. 1B) are attached. In addition, a peripheral surface of the electrolyte pour hole 15 of the sealing plate 12 has an inner annular first convex part 17a that surrounds the electrolyte pour hole 15 and that protrudes in the can axis direction and an outer annular second convex part 17b that surrounds the first convex part and that protrudes in the can axis direction. Here, as described in detail below, the first convex part 17a has a wider width than that of the second convex part 17b.

Figure 1B:
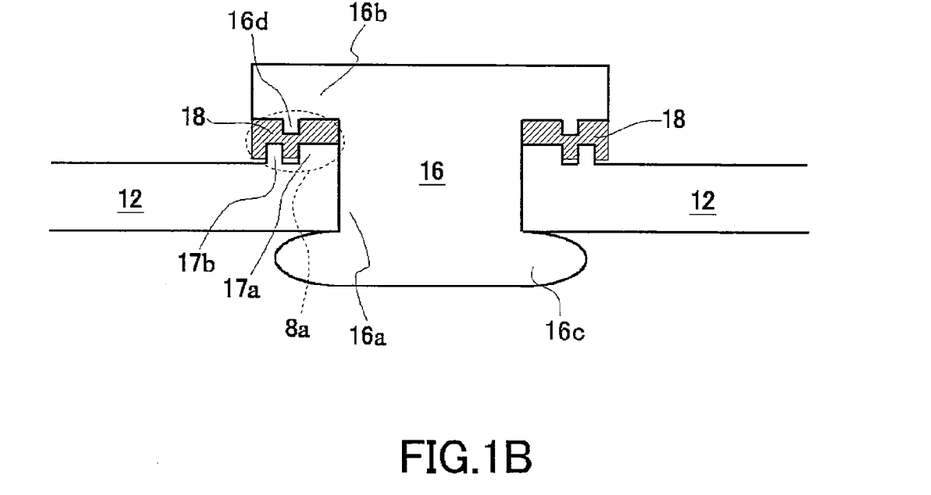
FIG. 1B is a cross-sectional view taken along the line IB-IB in FIG. 1A.

Furthermore, as shown in FIG. 1B, the rivet 16 has a shank part 16a inserted in the electrolyte pour hole 15, a flange part 16b covering the peripheral surface of the electrolyte pour hole 15, and a crimping part 16c. The rivet 16 is crimped to be fixed to the sealing plate 12 with the flange part 16b and the crimping part 16c. In addition, a back side of the flange part 16b has an annular third convex part 16d that protrudes in the can axis direction. As described in detail below, the third convex part 16d is substantially opposed to a groove formed between the first convex part 17a and the second convex part 17b.

In addition, an annular gasket 18 is interposed between the electrolyte pour hole 15 and the rivet 16. The gasket 18 is partially strongly compressed by the first convex part 17a, the second convex part 17b, and the third convex part 16d. Accordingly, the electrolyte pour hole 15 maintains a high sealing performance.

Figure 2:
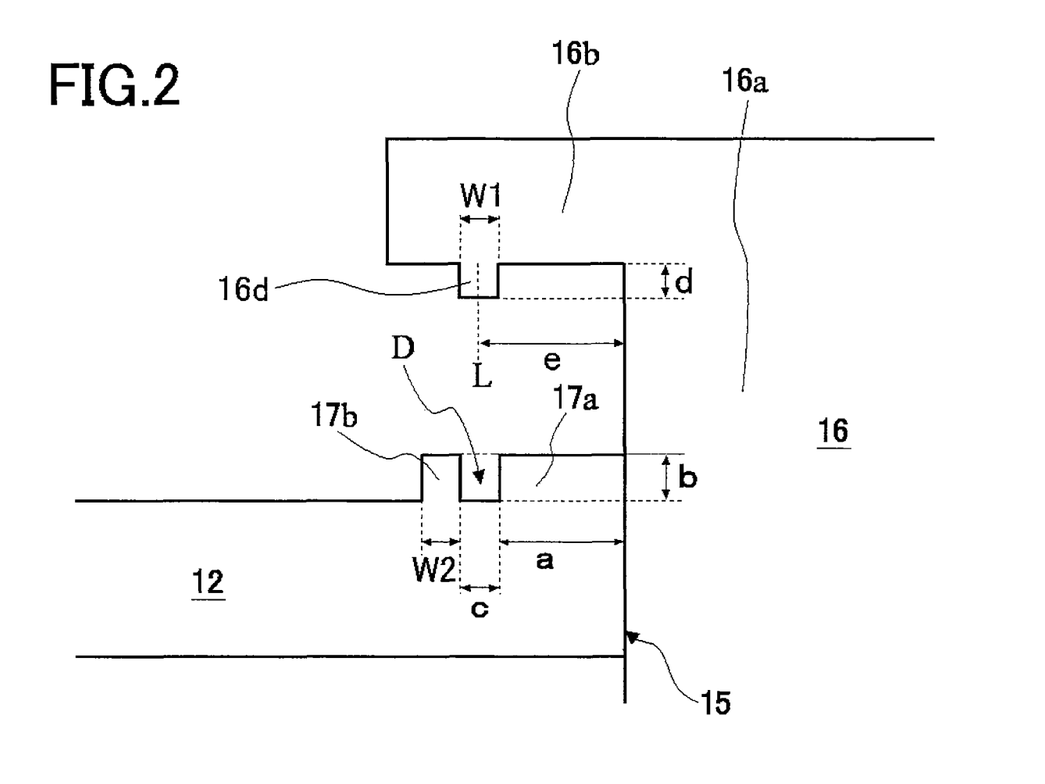
FIG. 2 is a cross-sectional view showing the detailed structure of a first convex part to a third convex part.

Next, using FIG. 2 and FIG. 3, the compression forces acting on the gasket will be explained when the first to third convex parts are formed. In FIG. 2 and FIG. 3B, the gasket is not shown.

FIG. 2 shows the present embodiment. The first convex part 17a has a section width "a" of about 0.6 mm and a height "b" of about 0.4 mm. The first convex part 17a partially compresses the inner peripheral part of the gasket 18, as well as provides mechanical strength to the sealing plate 12 to inhibit deformation of the peripheral part of the electrolyte pour hole 15 when the rivet 16 is crimped to be fixed to the sealing plate 12.

The second convex part 17b has a section width W2 of about 0.2 mm and a height "b" of about 0.4 mm. The second convex part 17b forms, together with the first convex part 17, a groove D having a width "c" of about 0.2 mm for dispersing the gasket pressure, as well as suppressing leaching out, from between the peripheral surface of the electrolyte pour hole 15 and the gasket, an electrolyte that adheres to and remains in the groove D.

The third convex part 16d has a section width W1 of about 0.2 mm and a height "d" of about 0.2 mm and is almost opposed to the groove D of the sealing plate 12. Furthermore, the distance "e" from the edge of the electrolyte pour hole 15 to the central vertical axis L of the third convex part 16d is about 0.6 to 0.8 mm. The third convex part 16d suppresses leaching out, from between the peripheral surface of the electrolyte pour hole 15 and the gasket, an electrolyte that remains in the groove D of the sealing plate 12. In the example shown here, there is no clearance between the shank part 16a of the rivet 16 and the electrolyte pour hole 15 of the sealing plate 12, but there may be a clearance therebetween and a cylinder-shaped gasket may be set in the clearance.

Figure 3A:
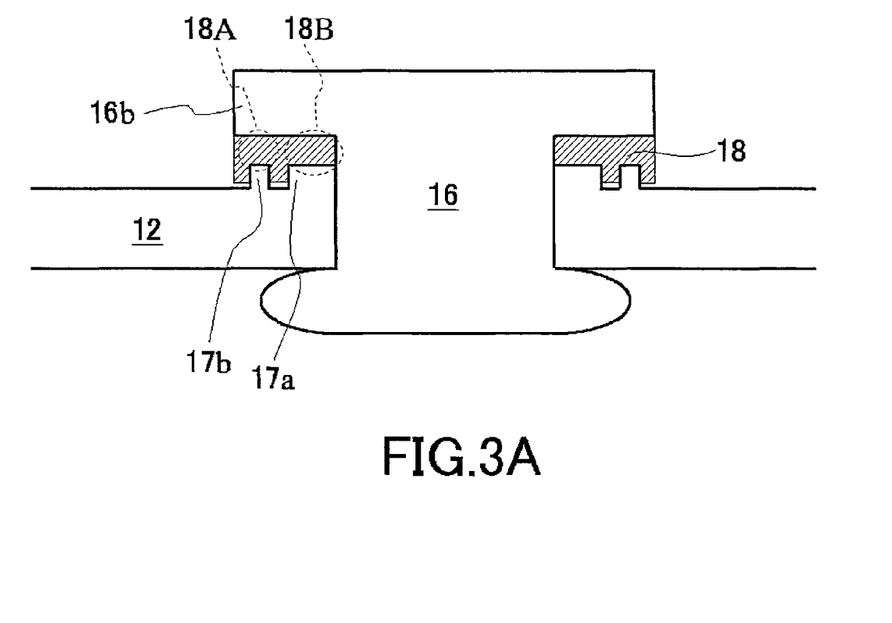
FIG. 3A is a cross-sectional view showing the electrolyte pour hole without the third convex part.

FIG. 3A shows a similar embodiment to the above embodiment including the sizes except that there is no third convex part 16d. As described above, the inner peripheral part 8a of the gasket 8 in a related-art example as shown in FIG. 6B is compressed by the annular convex part 7 and the flange part 6b of the rivet 6. In this case, the compressibility ((height before compression-height after compression)/height before compression) is about 50%.

On the other hand, in the case of the similar embodiment to the above embodiment except that there is no third convex part 16d shown in FIG. 3A, the leaching-out of an electrolyte is less in comparison with the related-art example, but each compressibility at the parts 18A and 18B of the gasket 18 is about 30% to slightly decrease the sealing performance. This is because a compressed gasket area is increased in comparison with the related-art example to increase the resistance to compression.

Figure 3B:
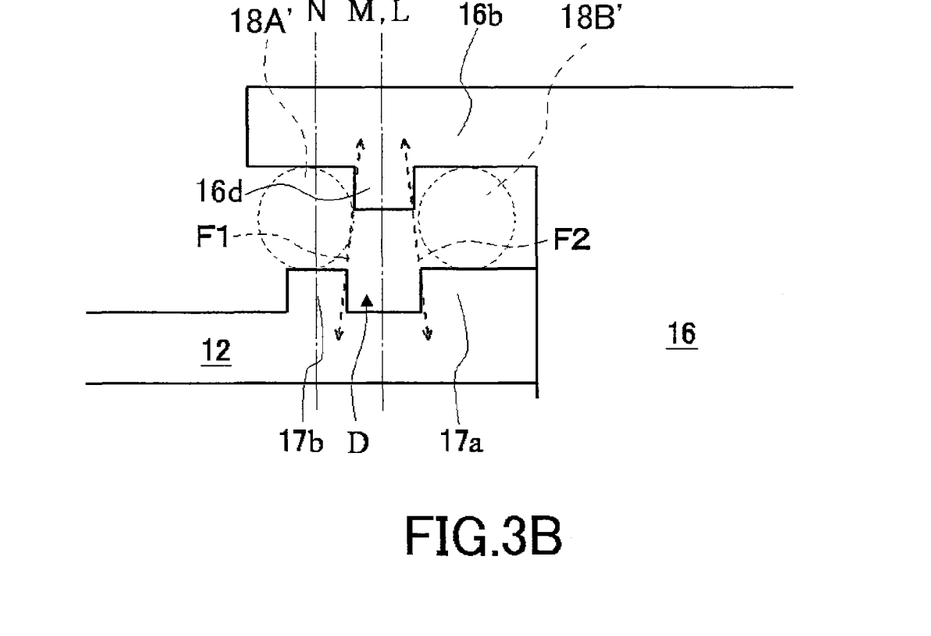
FIG. 3B is a cross-sectional view for explaining the role of the third convex part.

Hence, in the present embodiment, as shown in FIG. 3B, the third convex part 16d is formed on a back side of the flange part 16b of the rivet 16 so as to be almost opposed to the groove D formed between the first convex part 17a and the second convex part 17b. Such a structure provides a higher resistance to compression, and thus each of the regions 18A' and 18B' shown in FIG. 3B has, a compressibility of about 25%. At the same time, such a structure can provide shearing stresses in F1 and F2 directions. As a result, each compressibility in F1 and F2 directions reaches about 50%. In the example shown in FIG. 3B, the central vertical axis L of the third convex part 16d is placed at the same position as the central vertical axis M of the groove D of the sealing plate 12, where the section width W1 of the third convex part 16d=the width "c" of the groove D=0.2 mm.

Figure 4A:
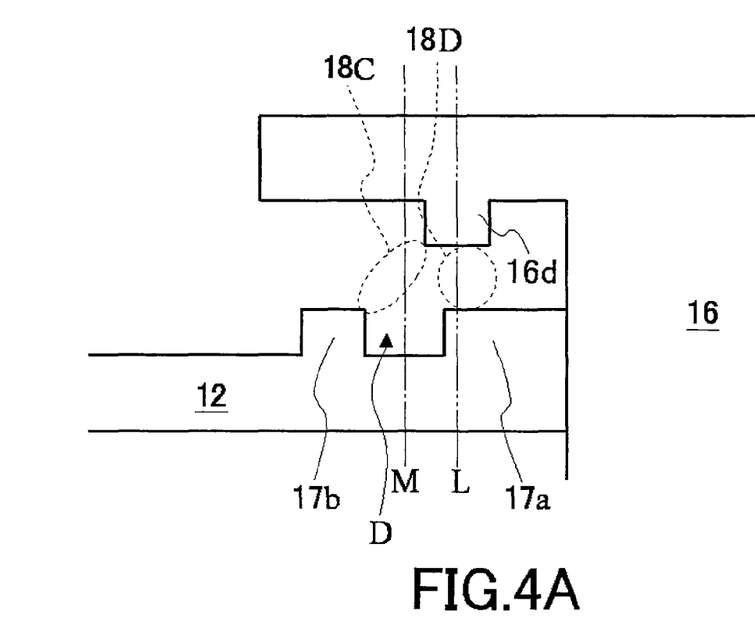
FIG. 4A is a cross-sectional view showing the sealing structure of an electrolyte pour hole in Comparative Example.
Figure 4B:
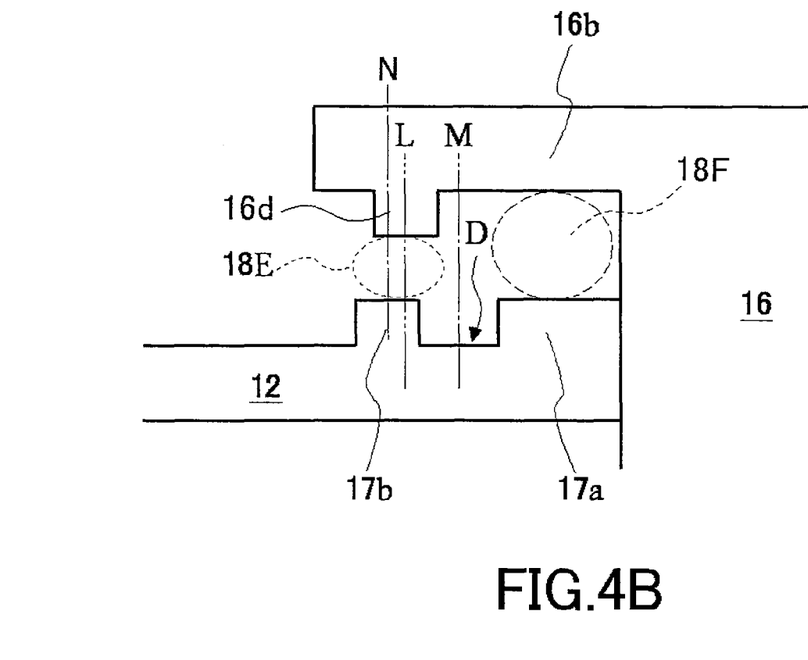
FIG. 4B is a cross-sectional view showing the sealing structure of the electrolyte pour hole in Example 1.

Furthermore, the above effect by the third convex part 16d varies depending on the relative position of the third convex part 16d to the second convex part 17b or the groove D. FIG. 4 show examples in which the relative position of the third convex part 16d is changed. That is, in FIG. 4A, the third convex part 16d is formed so that the position of the central vertical axis L of the third convex part 16d would be rightward shifted from the central vertical axis M of the groove D of the sealing plate 12 (closer to the first convex part 17a). When the battery has such a structure, the gasket part 18D between the third convex part 16d and the first convex part 17b maintains a compressibility of 60% or more, but the gasket part 18C between the third convex part 16d and the second convex part 17b has a significantly low compressibility of about 25%.

Moreover, in FIG. 4B, the third convex part 16d is formed so that the position of the central vertical axis L of the third convex part 16d would be leftward shifted from the central vertical axis M of the groove D of the sealing plate 12 (closer to the central vertical axis N of the second convex part 17b). In this case, the gasket part 18E between the third convex part 16d and the second convex part 17b readily has a compressibility of 60% or more. However, the gasket part 18F between the third convex part 16d and the first convex part 17b has a decreased compressibility of 40% or less.

Test for Detecting Leaching-Out

The tests for detecting leaching-out in the examples in which the relative position of the third convex part 16d to the second convex part 17b or the groove D is changed was performed as described below. First, a prismatic nonaqueous electrolyte secondary battery as the sealed battery similar to that in FIG. 5 was manufactured in a similar manner to that in the related-art example. Here, after a predetermined amount of nonaqueous electrolyte was poured from the electrolyte pour hole 15, the battery was left overnight and pre-charged to fit the nonaqueous electrolyte in the positive electrode plate, negative electrode plate, and separator. Next, the nonaqueous electrolyte was degassed by vacuum treatment, and then the electrolyte pour hole 15 was sealed with the rivet 16 in a similar manner to that in the related-art example shown in FIG. 6C.

Next, the battery outer can was entirely washed and then checked visually. The battery was charged until it reached full charge in a particular charging method. The fully charged battery was placed in a constant temperature bath with a relative humidity RH=90% at 60° C. for 24 hours. Then, the periphery of the rivet 16 was observed under a microscope of 50 magnifications to detect the presence of leaching-out. Here, when a white blot was observed around the rivet 16, the battery was judged to have leaching-out.

The test for detecting leaching-out was performed on each of one hundred batteries as shown in FIG. 3B in which the position of the central vertical axis L of the third convex part 16d was the same as that of the central vertical axis M of the groove D of the sealing plate 12 (Example 1), one hundred batteries as shown in FIG. 4A in which the position of the central vertical axis L of the third convex part 16d was rightward shifted from that of the central vertical axis M of the groove D of the sealing plate 12 (closer to the first convex part 17a) (Comparative Example), and one hundred batteries as shown in FIG. 4B in which the position of the central vertical axis L of the third convex part 16d was leftward shifted from that of the central vertical axis M of the groove D of the sealing plate 12 (closer to the central vertical axis N of the second convex part 17b) (Example 2). The mean value of the compressibility of each gasket part between the third convex part 16d and the second convex part 17b, and each mean value of the compressibility and leaching-out rate of each gasket part between the third convex part 16d and the first convex part 17a was calculated. The concluded results are shown in Table 1.

TABLE 1

| | Compressibility between Second Convex Part and Third Convex Part | Compressibility between First Convex Part and Third Convex Part | Leaching-Out Rate |
|---|---|---|---|
| Example 1 | 50% | 50% | 10% |
| Example 2 | 65% | 35% | 6% |
| Comparative Example | 25% | 65% | 56% |

The results shown in Table 1 reveal the following. That is, in the batteries in Comparative Example, even the gasket part between the third convex part 16d and the first convex part 17a had a compressibility of 50% or more, because the adhesion of the gasket part between the third convex part 16d and the second convex part 17b was extremely decreased, the leaching-out rate of the remaining electrolyte from between the peripheral surface of the electrolyte pour hole 5 and the gasket 18 reached as high as 56%. From the result in Comparative Example, the leaching-out of a remaining electrolyte was not sufficiently suppressed.

Meanwhile, in the batteries in Example 1, each gasket part between the third convex part 16d and the first convex part 17a and between the third convex part 16d and the second convex part 17b had a compressibility of 50%, and the leaching-out rate was 10%. Furthermore, in the batteries in Example 2, the gasket part between the third convex part 16d and the first convex part 17a had a low compressibility of 35% but the gasket part between the third convex part 16d and the second convex part 17b had a high compressibility of 65%, and the leaching-out rate was 6%. Thus, it is clear that, when at least the gasket between the third convex part 16d and the second convex part 17b has a compressibility of 50% or more, a battery can have a low leaching-out rate.

In addition, from the test results of Example 1 and Example 2, it is clear that the position of the central vertical axis L of the third convex part 16d is preferably slightly leftward shifted from the central vertical axis M of the groove D of the sealing plate 12 (closer to the central vertical axis N of the second convex part 17b). More specifically, when the width of the third convex part 16d is W1 and the width of the second convex part 17b is W2, it is preferable that the distance from the central vertical axis of the third convex part 16d to the central vertical axis N of the second convex part 17b is smaller than (W1+W2)/2.

The above results were obtained from the batteries in which the section width W1 of the third convex part 16d=the width "c" of the groove D=0.2 mm. However, it is clear that, when the third convex part 16d is superimposed over the second convex part 17b but not superimposed over the first convex part 17b in a plan view, the gasket part between the third convex part 16d and the second convex part 17b can have a larger compressibility than that of the gasket part between the third convex part 16d and the first convex part 17a. Therefore, in the invention, when the third convex part 16d is superimposed over the second convex part 17b but not superimposed over the first convex part 17b in a plan view, the fine effects are exerted regardless of the relation between W1 and W2.

In the embodiment, the nonaqueous electrolyte secondary battery is exemplified as a sealed battery, but the invention is not limited to the examples and can equally well be applied to sealed batteries using an aqueous electrolyte, such as a nickel-hydrogen secondary battery and a nickel-cadmium secondary battery.

What is claimed is:

1. A sealed battery comprising:
   an outer can having a mouth portion;
   a sealing plate for sealing the mouth portion of the outer can;
   an electrolyte pour hole passing through the sealing plate;
   a rivet having a shank part inserted in the electrolyte pour hole and a flange part covering a peripheral surface of the electrolyte pour hole; and
   a gasket interposed between the peripheral surface of the electrolyte pour hole and a back side of the flange part of the rivet; wherein
   on the peripheral surface of the electrolyte pour hole, an inner annular first convex part and an outer annular second convex part being formed,
   on the back side of the flange part of the rivet, an annular third convex part being formed, and
   a central vertical axis of the third convex part being placed between a central vertical axis of a groove between the first convex part and the second convex part and the central vertical axis of the second convex part.

2. The sealed battery according to claim 1, wherein the central vertical axis of the third convex part is placed closer to the second convex part than the central vertical axis of the groove between the first convex part and the second convex part.

3. The sealed battery according to claim 1, wherein the third convex part is formed not to be superimposed over the first convex part but to be superimposed over the second convex part in a plan view.

4. The sealed battery according to claim 1, wherein the first convex part has a wider width than the width of the second convex part.

5. The sealed battery according to claim 1, wherein when the width of the third convex part is W1 and the width of the second convex part is W2, the distance between the central vertical axis of the third convex part and the central vertical axis of the second convex part is smaller than (W1+W2)/2.

6. The sealed battery according to claim 3, wherein when the width of the third convex part is W1 and the width of the second convex part is W2, the distance between the central vertical axis of the third convex part and the central vertical axis of the second convex part is smaller than (W1+W2)/2.

7. The sealed battery according to claim 4, wherein when the width of the third convex part is W1 and the width of the second convex part is W2, the distance between the central vertical axis of the third convex part and the central vertical axis of the second convex part is smaller than (W1+W2)/2.

* * * * *